United States Patent Office 3,387,924
Patented June 11, 1968

3,387,924
PROCESS FOR THE MANUFACTURE OF SODIUM TRIPOLYPHOSPHATE WITH A HIGH CONTENT OF PHASE-I-MATERIAL (HIGH TEMPERATURE MODIFICATION)
Gero Heymer, Knapsack, near Cologne, Gerhard Hartlapp, Hermulheim, near Cologne, and Karl Traulsen, Knapsack, near Cologne, Germany, assignors to Knapsack Aktiengesellschaft, Knapsack, near Cologne, Germany, a corporation of Germany
No Drawing. Filed May 19, 1966, Ser. No. 551,195
Claims priority, application Germany, June 18, 1965, K 56,410
7 Claims. (Cl. 23—107)

ABSTRACT OF THE DISCLOSURE

Sodium tripolyphosphate prepared by spraying an orthophosphate feed solution containing $P_2O_5$ and $Na_2O$ in a molar ratio of about 3:5 from a spray tower, rapidly dehydrating and effecting intermolecular condensation of the material, venting off gas from the spray tower at a temperature of about 400–520° C. and thereafter cooling the product down to about 280° C. under a partial steam pressure not exceeding about 300 mm. mercury in the gas phase surrounding said product.

---

The present invention relates to a process for making sodium tripolyphosphate with a high content of phase-I-material (high temperature modification) by subjecting an orthophosphate solution in a single operation to spraying, rapid dehydration and intermolecular condensation.

Sodium tripolyphosphate is known to exist in two different crystalline modifications, i.e., in the high temperature modification, also termed form-I or phase-I, which is stable at temperatures above about 420° C. up to the melting point of sodium tripolyphosphate, and in the low temperature modification, also termed form-II or phase-II, which is stable at temperatures below about 420° C. These two forms of sodium tripolyphosphate are briefly called hereinafter $Na_5P_3O_{10}$-I and $Na_5P_3O_{10}$-II, respectively.

The two forms have identical chemical properties and produce identical solutions, but on being subjected to hydration they show a very different behaviour which is the result of the varying bond structures in the crystal lattice. In contact with water, $Na_5P_3O_{10}$-I undergoes hydration much more rapidly than $Na_5P_3O_{10}$-II. The extremely high hydration velocity of $Na_5P_3O_{10}$-I has been found to result in considerable difficulties being encountered in the preparation of detergent batches. This is the reason why sodium tripolyphosphates containing a fairly small proportion of form-I material have been preferred heretofore in this field of application and why phosphate manufacturers have attempted to make such products. However, as the control of the hydration of $Na_5P_3O_{10}$-I could recently be improved, it has become desirable for some types of detergent preparation to use sodium tripolyphosphates with a fairly high content of phase-I-material.

Basically, the preparation of $Na_5P_3O_{10}$ requires not more than tempering the starting material for a sufficiently long period of time at temperatures above about 420° C., and the temper period may be the shorter the higher the temperature. Two-stage processes for making $Na_5P_3O_{10}$, wherein an orthophosphate/pyrophosphate mixture is tempered in a rotary tube, can in practice also be used for making $Na_5P_3O_{10}$-I. The single stage spray tower process described in German specification No. 1,097,421, which can be carried out under much more economic conditions, so far did not permit making products containing more than about 80% by weight $Na_5P_3O_{10}$-I; even the manufacture of products containing more than 40% $Na_5P_3O_{10}$-I was sometimes found to fail for unknown reasons. Even if the temperature prevailing in the ring burner zone was so considerably raised that the off-gas issued at temperatures above 420° C., the product was found still to contain at least 20% $Na_5P_3O_{10}$-II or more.

It has now unexpectedly been found that sodium tripolyphosphate containing more than 40%, preferably more than 60%, and up to approximately 100% form-I material can also be obtained in a single stage process by spraying an orthophosphate solution containing $P_2O_5$ and $Na_2O$ in a molar ratio of 3:5 in a spray tower with the off-gases leaving the spray tower at a temperature of 400 to 520° C., preferably 420 to 500° C., provided however that the product formed in the spray tower is cooled under quite specific conditions.

Extensive investigation has shown that the product in accordance with this invention is obtained when the sodium tripolyphosphate formed is cooled within a period of time of less than 10 minutes, preferably less than 4 minutes, from initially 450° C. down to 280° C. and when, in the gas phase surrounding the sodium tripolyphosphate, a steam partial pressure value of less than about 300 mm. mercury, preferably less than 100 mm. mercury, is maintained while the sodium tripolyphosphate is being cooled.

When the product sprayed has a temperature of less than 420° C., it should be heated to a temperature above about 420° C. and cooled then in the manner described.

More accurate investigation of the mechanism underlying the present reaction has shown that in contrast with previous expert opinions $Na_5P_3O_{10}$-I formed at high temperature undergoes transformation into $Na_5P_3O_{10}$-II within a short reaction period when the gas phase is governed by steam of high partial pressure. The process of the present invention thus enables without difficulty firstly the transformation of phase-I into phase-II material to be substantially completely avoided, and it secondly enables products with a predetermined proportion of $Na_5P_3O_{10}$-I to be produced by allowing the hot spray product having a temperature of more than 420° C. to cool under accurately controlled conditions, determined empirically for the partial pressure of the steam and the temperature/time pattern.

The following examples illustrate the process of the present invention.

Example 1

Sodium tripolyphosphate prepared in a spray tower of the type described in German specification No. 1,018,394 from an orthophosphate solution containing $Na_2O$ and $P_2O_5$ in a molar ratio of 5:3 at an off-gas temperature of 420° C. was cooled within 9 minutes down to a temperature of 280° C. under a steam partial pressure value of 280 mm. mercury. The content of $Na_5P_3O_{10}$-I determined by X-ray goniometry was found to be 71%. When the period during which the product was cooled from 420° C. down to 280° C. was prolonged to 24 minutes, the product was found to contain only 30% $Na_5P_3O_{10}$-I.

Example 2

Sodium tripolyphosphate prepared in a spray tower under the conditions set forth in Example 1 was removed, once it had left the flame zone, from the range governed by steam of high partial pressure, and cooled within 10 minutes down to a temperature of 280° C. under a steam partial pressure value of 50 mm. mercury. The product was found then to contain 86% $Na_5P_3O_{10}$-I.

Example 3

Sodium tripolyphosphate prepared in a spray tower under the conditions set forth in Example 1, save that the off-gases had a temperature of 460° C., was removed, once it had left the flame zone, from the range governed by steam of high partial pressure, and cooled within 3 minutes down to a temperature of 280° C. under a steam partial pressure value of 20 mm. mercury. The product was found then to be formed of 97–98% $Na_5P_3O_{10}$-I.

The products were cooled in accordance with this invention, e.g., by means of a cooling drum series-connected to the spray tower.

We claim:

1. A process for preparing sodium tripolyphosphate containing more than 40% up to about 100% phase-I-material, comprising subjecting a solution of corresponding sodium orthophosphate feed material containing $P_2O_5$ and $Na_2O$ in a molar ratio of about 3:5 in a single operation to the steps of spraying in a spray tower, rapidly dehydrating, and intermolecular condensation; venting off-gas from the spray tower at a temperature of about 400–520° C. and thereafter cooling the resulting product down to about 280° C. over a period not exceeding 10 minutes under a partial steam pressure not exceeding about 300 mm. mercury in the gas phase surrounding said product.

2. The process of claim 1 wherein the sodium tripolyphosphate product contains more than 60% $Na_5P_3O_{10}$-I 3. The process of claim 1 wherein the off-gas leaves the spray tower at a temperature of 420–500° C.

4. The process of claim 1 wherein sodium tripolyphosphate product is cooled within less than 4 minutes from 450 to 280° C.

5. The process of claim 1 wherein a steam partial pressure not exceeding 100 mm. mercury is maintained while sodium tripolyphosphate product is being cooled.

6. The process of claim 1 wherein sprayed product having a temperature of less than 420° C. is heated to a temperature above 420° C. and thereafter cooled.

7. The process of claim 6 wherein sprayed product is heated to a temperature of 420–520° C.

No references cited.

OSCAR R. VERTIZ, *Primary Examiner.*

EARL C. THOMAS, *Examiner.*

L. A. MARSH, *Assistant Examiner.*